United States Patent [19]

Nozoki

[11] Patent Number: 5,686,146

[45] Date of Patent: Nov. 11, 1997

[54] METHOD OF AND APPARATUS FOR INJECTING TREATING-LIQUID INTO WOOD MATERIAL AND POROUS INORGANIC MATERIAL, AND METHOD FOR DESTROYING RAY PARENCHYMA CELL WALLS AND ASPIRATED PIT PAIR

[75] Inventor: Masateru Nozoki, Akita, Japan

[73] Assignee: Sumitomo Corporation, Tokyo, Japan

[21] Appl. No.: 424,901

[22] Filed: Apr. 19, 1995

Related U.S. Application Data

[63] Continuation-in-part of Ser. No. 173,492, Dec. 23, 1993, abandoned.

[51] Int. Cl.$^6$ .................................. B05D 1/18; B05D 3/00
[52] U.S. Cl. .......................... 427/297; 427/393; 427/440; 427/325; 427/351; 118/50; 118/407
[58] Field of Search .................................. 427/294, 297, 427/298, 351, 325, 393, 393.3, 393.4, 397, 440; 118/50, 400, 407

[56] References Cited

U.S. PATENT DOCUMENTS

| | | |
|---|---|---|
| 1,602,577 | 10/1926 | Heckert . |
| 2,786,784 | 3/1957 | Henriksson ........................ 117/116 |
| 3,632,409 | 1/1972 | Barnett, Jr. ........................ 117/113 |
| 3,693,584 | 9/1972 | Barnett, Jr. ........................ 118/50 |
| 3,895,138 | 7/1975 | Sewell et al. ..................... 427/298 |
| 4,194,033 | 3/1980 | Motai ................................ 427/351 |
| 4,637,952 | 1/1987 | Rosenlund ........................ 427/297 |

FOREIGN PATENT DOCUMENTS 2021952  12/1979  United Kingdom .

*Primary Examiner*—Shrive Beck
*Assistant Examiner*—Brian K. Talbot
*Attorney, Agent, or Firm*—Dennison, Meserole, Pollack & Scheiner

[57] ABSTRACT

A method for injecting a treating liquid into a wood or stone material. The liquid is injected in an initial pressure-applying/injecting step in which the wood or stone material is immersed at ambient temperature in a treating liquid under an initial liquid pressure of 1 to 10 kg/cm$^2$, and maintained at this pressure for a period of time. Subsequently, the pressure is increased to a final pressure having a maximum value of 50 kg/cm$^2$. Where wood is being treated, the pressure is raised in a plurality of steps of 5 to 10 kg/cm$^2$ each, followed by a defined holding period. Where stone is being treated, the pressure is increased in a single step. Finally, the treated material is depressurized over a period of at least 20 minutes.

17 Claims, 16 Drawing Sheets

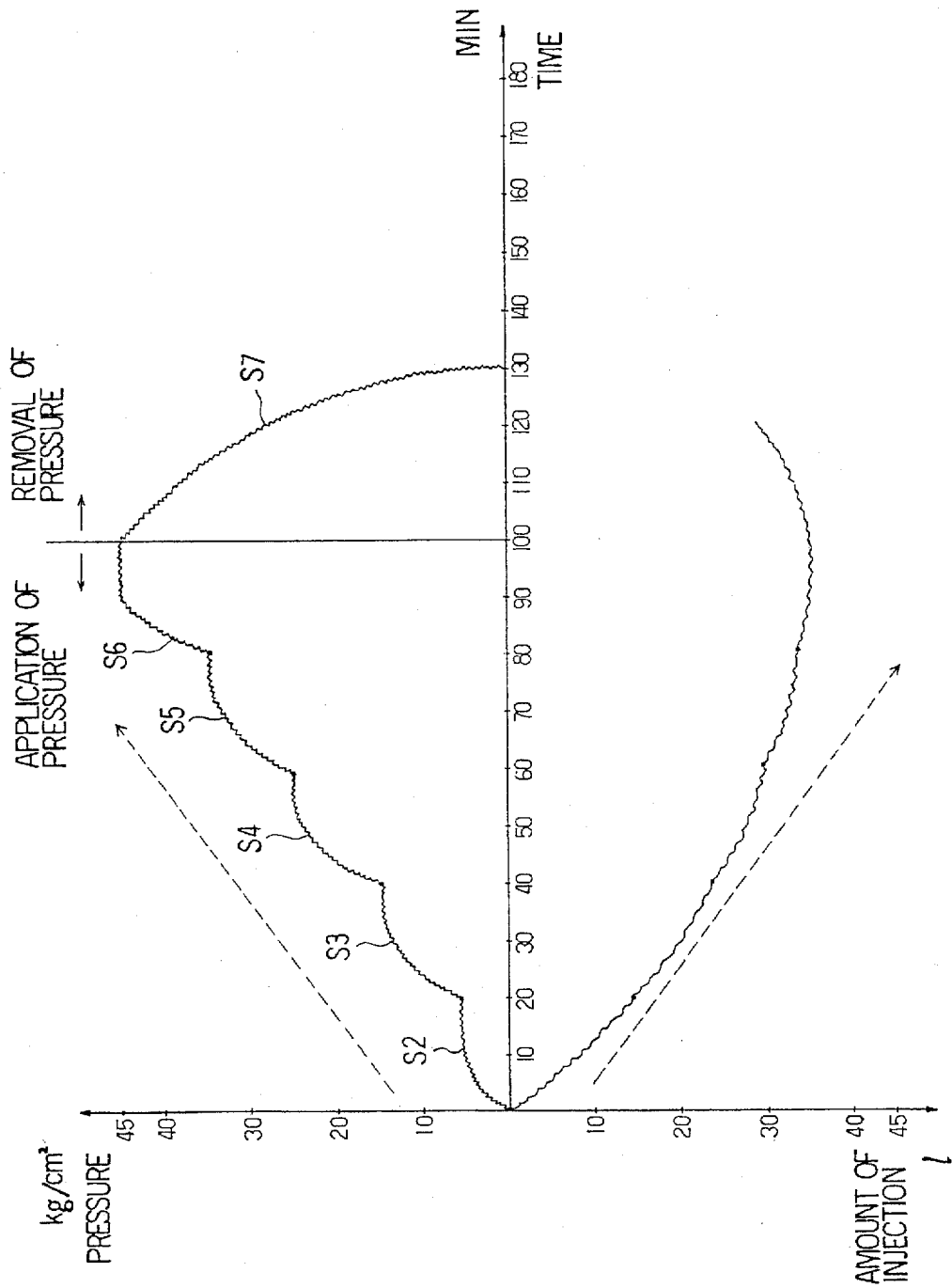

| STEP | 1 | 2 | 3 | 4 | 5 | 6 | 7 | TOTAL |
|---|---|---|---|---|---|---|---|---|
| PRESSURE (kg/cm²) | -760 mmHg | 0~5 | 6~15 | 16~25 | 26~35 | 36~45 | 45~0 | — |
| TIME (MIN) | 20 | 20 | 20 | 20 | 20 | 20 | 30 | 150 |
| AMOUNT OF INJECTION(l) | 0 | 12 | 9 | 5 | 4 | 4 | -3 | 31 |

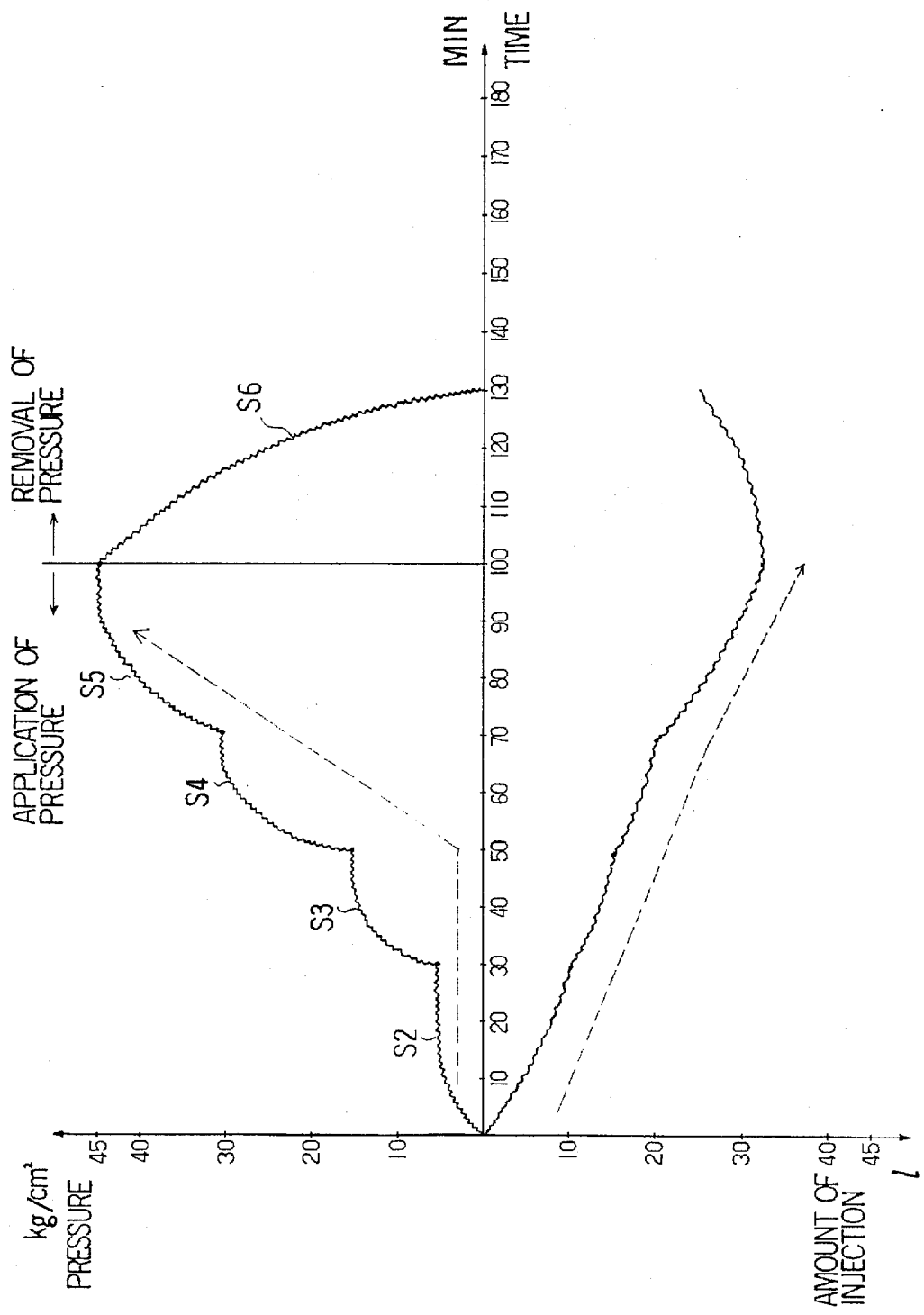

| STEP | 1 | 2 | 3 | 4 | 5 | 6 | TOTAL |
|---|---|---|---|---|---|---|---|
| PRESSURE (kg/cm²) | -760 mmHg | 0~5 | 6~15 | 16~30 | 31~45 | 45~0 | — |
| TIME (MIN) | 60 | 30 | 20 | 20 | 30 | 30 | 190 |
| AMOUNT OF INJECTION(l) | 0 | 10 | 4 | 6 | 11 | -6 | 25 |

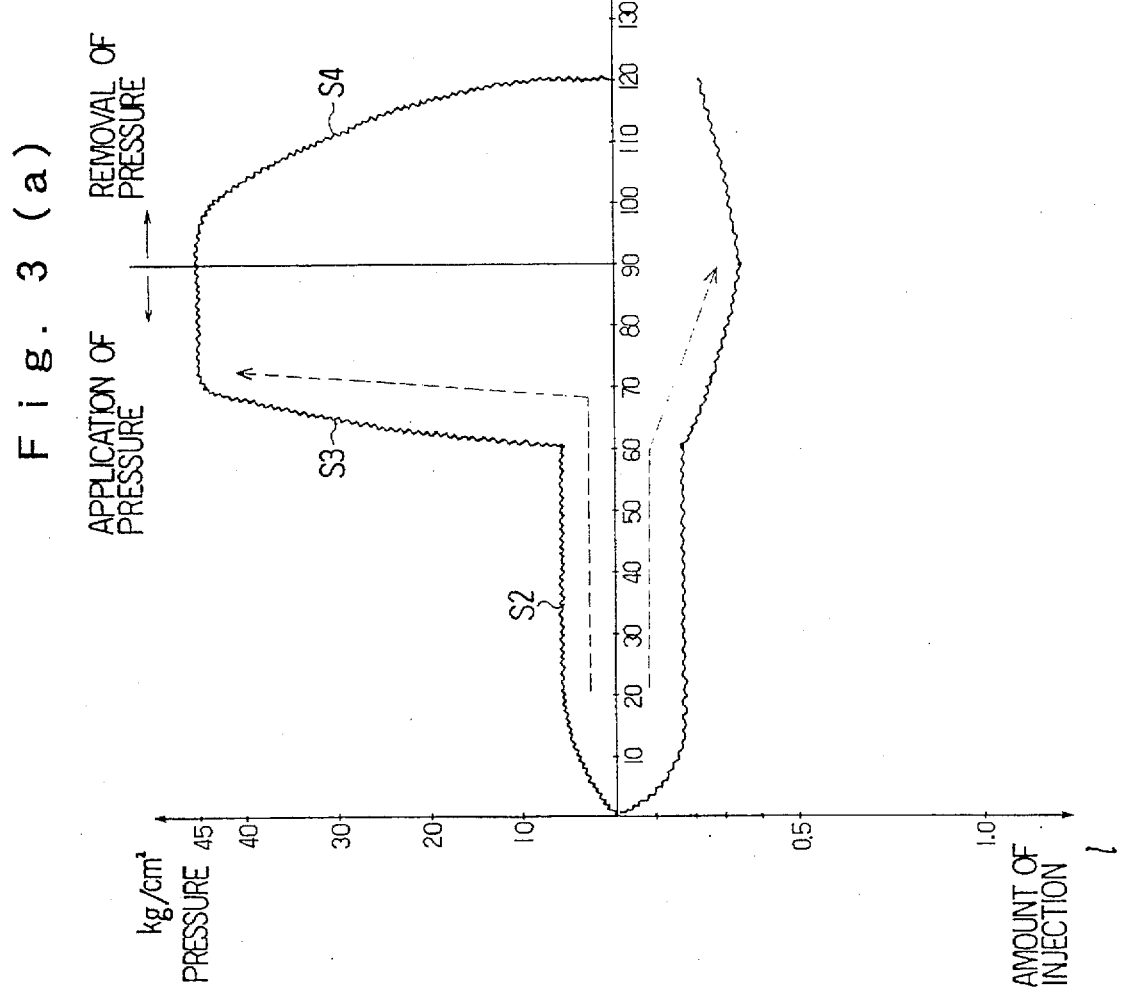

| STEP | 1 | 2 | 3 | 4 | TOTAL |
|---|---|---|---|---|---|
| PRESSURE (kg/cm²) | -760 mmHg | 0~5 | 6~45 | 45~0 | — |
| TIME (MIN) | 120 | 60 | 30 | 30 | 240 |
| AMOUNT OF INJECTION(l) | 0 | 0.15 | 0.2 | -0.5 | 0.3 |

Fig. 6
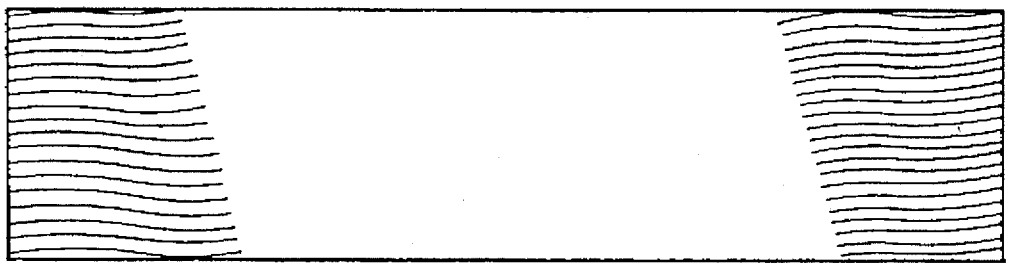
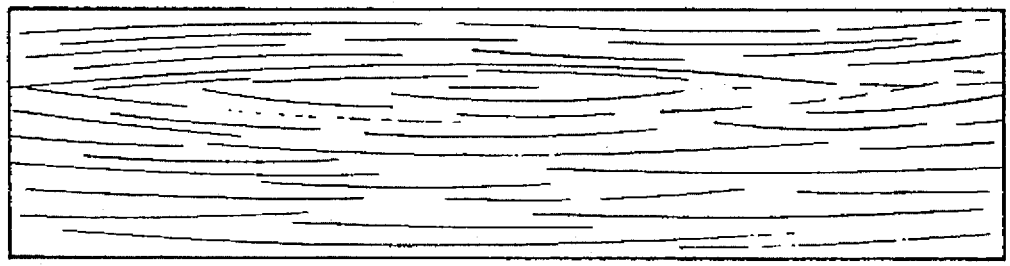

Fig. 11 (a)

| DIMENSIONS cm | VALUE cm³ | CALCULATED VALUE OF CONTAINED WATER'S RATE % | CALCULATED VALUE OF THE POSSIBLE AMOUNT OF INJECTION $l$ | WEIGHT BEFORE THE INJECTION kg | WEIGHT AFTER THE INJECTION kg | AMOUNT OF INJECTION $l$ |
|---|---|---|---|---|---|---|
| 277.5×225×17 | 106,144 | 50 | 52.5 | 69 | 100 | 31 |
| AMOUNT OF INJECTION PER VALUE kg | | SPECIFIC GRAVITY BEFORE THE INJECTION | SPECIFIC GRAVITY AFTER THE INJECTION | TRUE SPECIFIC WEIGHT 1.50 | | |
| 292 | | 0.65 | 0.94 | TOTAL DRY SPECIFIC WEIGHT 0.43 | | |

Fig. 11 (b)

| DIMENSIONS cm | VALUE cm³ | CALCULATED VALUE OF CONTAINED WATER'S RATE % | CALCULATED VALUE OF THE POSSIBLE AMOUNT OF INJECTION $l$ | WEIGHT BEFORE THE INJECTION kg | WEIGHT AFTER THE INJECTION kg | AMOUNT OF INJECTION $l$ |
|---|---|---|---|---|---|---|
| 270.5×22.5×17 | 103,466 | 44 | 28.2 | 98 | 123 | 25 |
| AMOUNT OF INJECTION PER VALUE kg | | SPECIFIC GRAVITY BEFORE THE INJECTION | SPECIFIC GRAVITY AFTER THE INJECTION | TRUE SPECIFIC WEIGHT 1.50 | | |
| 242 | | 0.947 | 1.119 | TOTAL DRY SPECIFIC WEIGHT 0.73 | | |

Fig. 1 1 (c)

| DIMENSIONS cm | WEIGHT BEFORE THE INJECTION kg | WEIGHT AFTER THE INJECTION kg | AMOUNT OF INJECTION $l$ |
|---|---|---|---|
| 70 × 30 × 3 | 17.8 | 18.1 | 0.3 |

Fig. 1 2 (c)
Fig. 1 2 (d)
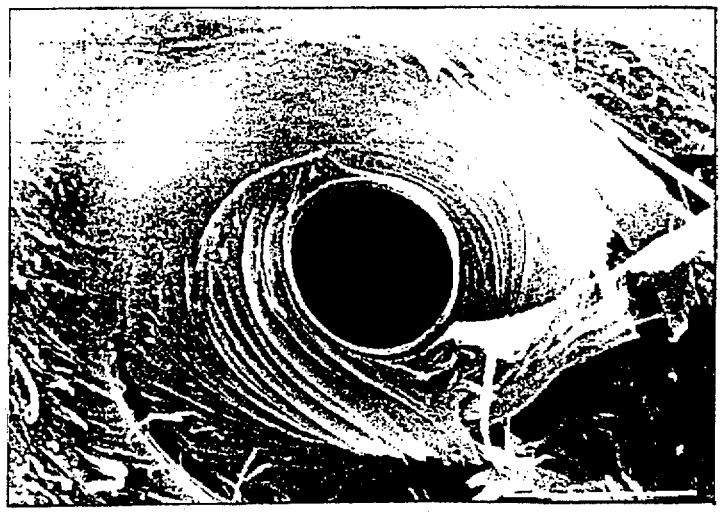

METHOD OF AND APPARATUS FOR INJECTING TREATING-LIQUID INTO WOOD MATERIAL AND POROUS INORGANIC MATERIAL, AND METHOD FOR DESTROYING RAY PARENCHYMA CELL WALLS AND ASPIRATED PIT PAIR

The present application is a Continuation-In-Part of the parent application Ser. No. 173,492, filed Dec. 23, 1993 now abandoned.

BACKGROUND OF THE INVENTION

1. Field of the Invention

The present invention relates to a method of and apparatus for injecting treating liquid such as resin into wood material and stone material. More particularly, the present invention relates to a method of injecting a treating liquid which gives the wood material high rot resistance, insect resistance, ant resistance, mold resistance, flame resistance, dimensional stability, and increased strength, and which gives the stone material increased acid resistance. The present invention also relates to a method of destroying ray parenchyma cell walls and aspirated pit-pairs.

2. Description of the Related Arts

Hitherto, various methods have been used such as injecting treating liquids into the wood material, as heat-treating and applying pressure on it, as pouring liquids into it after boiling, for making it highly flame resistant, rot resistant and insect resistant, and for giving it high dimensional stability and increased strength.

The treating liquids have been injected into the wood material by applying thereupon pressure right up to a specified pressure in a short time while maintaining that pressure for a long period of time. In this case, though depending on the kind of wood material used, the injection of the treating liquid has been generally carried out at a pressure not more than 15 kg/cm$^2$ because injection carried out above this pressure causes the wood material to deform such as to warp, bend, or to become thinner.

As such a treatment method, there is known a wood treating process disclosed in U.S. Pat. No. 4,194,033 (Motai). With this disclosed process, wood is heat-treated and boiled so that film holes are opened by pressure and temperature. Also, as described in U.S. Pat. No. 3,693,584 (Barnett), there is a proposed method by which pressure is slowly intermittently raised for injecting treating liquid. Note that U.S. Pat. No. 3,693,584 (Barnett) discloses an apparatus by which pulse pressure is applied to open and close wall holes for injecting treating liquid, aiming to, e.g., shorten the treatment time and inject the treating liquid into the wood core sufficiently. Further, typical one of treating-liquid injecting apparatus is disclosed in U.S. Pat. No. 3,895,138 (Sewell).

In recent years, deterioration of buildings made of stone material caused by acid rain has become a problem in Europe. Various measures have been taken to protect the stone material from acid rain, such as applying the treating liquid to the stone material, and taking advantage of the properties of the stone material itself, such as the property of marble to neutralize acid water which comes in contact with its surface.

The wood material generally has many groups of cells as shown in FIG. 8. Between each cell is a structure consisting of a wall pit-pair 1 scattered about forming wall pit 2 as shown in FIG. 9(a). At the center of the wall hole 2 is a hyperplastic portion, called a torus 3. The torus 3 is surrounded by a thin mesh-like pattern (margo). In the wood material having this kind of structure, in the process of processing the wood material into heart wood and the like, the wall pit wall is drawn toward one of the pit openings, so that the torus 3 blocks the pit opening. The wood material in this condition is said to have an aspirated pit-pair (FIG. 9(b)). When the wood material has an aspirated pit-pair, which is seen in the heart wood in many cases, the torus 3 blocks the pit 2. The wall pit 2 in the heart wood as well as those in the sap wood are also blocked by the torus 3. For this reason, in order to spread the treating liquid throughout the wood material, it is necessary to destroy the torus 3 which blocks the pit opening of an aspirated pit-pair, or to destroy the cell wall itself, so that the treating liquid can permeate into adjacent cells.

In order to destroy the torus 3 to those at the center of the material, an applied pressure of 30 kg/cm$^2$ has been required using the conventional treating-liquid injecting methods. However, as described above the material has been deformed at an applied pressure of 15 kg/cm$^2$ or more. As a result, it has been necessary to carry out the injection at a low pressure which does not cause deformation of the material. Consequently, there has not been enough pressure to destroy the torus 3 adequately and inject sufficient treating liquid into the interior of the wood material.

The wood treating process using heating and boiling as disclosed in U.S. Pat. No. 4,194,033 (Motai) remarkably deteriorates the strength of wood. Also, because the pressure for pressurization is as low as 1.5 kg/cm$^2$ to 2 kg/cm$^2$, the external pressure is in balance with gases in the treated material and hence the treating liquid cannot be injected into the wood core (for a Japanese red pine of 250×250×2000 mm, a maximum average value of the penetration depth is 85 mm: see Table 1).

Further, while U.S. Pat. No. 3,693,584 (Barnett) describes pressurization, the maximum raised pressure is generally on the order of 15 kg/cm$^2$ as mentioned above and, therefore, the treating liquid cannot be injected into the wood core even if the pressure is slowly intermittently raised. This is also apparent from the fact that one object of U.S. Pat. No. 3,693,584 (Barnett) is to sufficiently inject the treating liquid into the wood core. U.S. Pat. No. 3,693,584 (Barnett) intends to inject the treating liquid by increasing and decreasing the pressure-applying force with a short period, i.e., to improve quality of the injection treatment from the different standpoint from that of the present invention.

On the other hand, particularly for broadleaf trees, pressure is applied to the wood material to a predetermined pressure. For this reason, impurities such as tylose get clogged in the vessels, making it extremely difficult to inject the treating liquid to the central portion of the material.

In addition, the stone material has been only protected at the surface because the treating liquid has only been applied to the surface thereof, and because of the nature of the stone material itself. As the stone material was exposed to acid rain over a long period of time, its acid resistance decreased, so that the measures taken against the acid rain became ineffective. As a result, the acid rain permeated to the interior, and the stone material was eaten away from the interior, resulting in a powdered interior and the like.

SUMMARY OF THE INVENTION

The present invention is intended to overcome the above-described problems and has as its object the provision of a method of and an apparatus for injecting a treating liquid into wood material and porous inorganic material so that the treating liquid spreads throughout the interior thereof, without deforming the wood material, stone material, and other materials to be treated. The present invention has as another object the provision of a method of destroying ray parenchyma cell walls and aspirated pit-pairs.

To achieve the above objects, the present invention provides a method of destroying ray parenchyma cell walls and aspirated pit-pairs of conifers, and injecting treating liquid into conifers, the method comprising an initial pressure-applying/injecting step of liquid-pressurizing the treated wood material at the normal temperature under pressure in the range of 1 to 10 kg/cm$^2$, and holding the raised pressure for at least 10 minutes to inject the treating liquid into the tracheid of the treated material a treating-liquid injecting step of, after elapse of the time holding the above raised pressure, stepwisely pressurizing the treated material at the normal temperature up to the final applied pressure having a maximum value of 50 kg/cm$^2$ with intervals of 5 to 10 kg/cm$^2$, and holding the raised pressure in each of the pressure-applying stages for at least 10 minutes to inject the treating liquid under pressure into the treated wood while dissolving the gases remaining in the treated wood in the treating liquid, and a pressure-removing step of depressurizing the treated wood from the final applied pressure to the atmospheric pressure for a period extended to at least 20 or more minutes to prevent the treated wood from being broken due to abrupt expansion of the gases dissolved in the treating liquid injected into the material. Preferably, a pressure-reducing step of depressurizing the treated wood down to at least the atmospheric pressure or below, and holding the reduced pressure for at least 20 minutes to purge gases out of the treated wood may be interposed before the initial pressure-applying/injecting step.

Also, in a method of destroying ray parenchyma cell walls and aspirated pit-pairs of broadleaf trees, and injecting treating liquid into conifers, the method comprises a pressure-reducing step of depressurizing the treated wood material down to at least the atmospheric pressure or below, and holding the reduced pressure for at least 30 minutes to purge gases out of the treated material, an initial pressure-applying/injecting step of liquid-pressurizing the treated wood at the normal temperature under pressure in the range of 1 to 10 kg/cm$^2$, and holding the raised pressure for at least 20 minutes to inject the treating liquid into the tracheid of the treated material, a treating-liquid injecting step of, after elapse of the time holding the raised pressure, stepwisely pressurizing the treated wood at the normal temperature up to the final applied pressure having a maximum value of 50 kg/cm$^2$ with intervals of 5 to 20 kg/cm$^2$, and holding the raised pressure in each of the pressure-applying stages for at least 10 minutes to inject the treating liquid under pressure into the treated wood while dissolving the gases remaining in the treated wood in the treating liquid, and a pressure-removing step of depressurizing the treated material from the final applied pressure to the atmospheric pressure for a period extended to at least 20 or more minutes to prevent the treated wood from being broken due to abrupt expansion of the gases dissolved in the treating liquid injected into the treated wood.

Further, concerning a method of injecting treating liquid into stone materials in the present invention, the method comprises a pressure-reducing step of depressurizing a treated material down to at least the atmospheric pressure or below, and holding the reduced pressure for at least 60 minutes to purge gases out of the treated material, an initial pressure-applying/injecting step of liquid-pressurizing the treated material at the normal temperature under pressure in the range of 1 to 10 kg/cm$^2$, and holding the raised pressure for at least 60 minutes to inject the treating liquid into cracks inside the treated material, a treating-liquid injecting step of, after elapse of the time holding the raised pressure, pressurizing the treated material at the normal temperature up to final applied pressure having a maximum value of 50 kg/cm$^2$ at one time, and holding the final applied pressure for at least 30 minutes to inject the treating liquid under pressure into the treated material while dissolving the gases remaining in the treated material in the treating liquid, and a pressure-removing step of depressurizing the treated material from the final applied pressure to the atmospheric pressure for a period extended to at least 20 or more minutes to prevent the treated material from being broken due to abrupt expansion of the gases dissolved in the treating liquid injected into the treated material.

Preferably, the treated material is pressurized under dynamic pressure by using a pressure-applying pump of delivery constant type. When treating wood materials, the treating liquid may be a cation-base treating liquid prepared by emulsifying plant oil or mineral oil with a cationic surfactant. On the other hand, when treating stone materials, the treating liquid may be one containing silane monomers as a main component.

According to the method of injecting treating liquid related to the present invention, establishing an initial pressure-applying/injecting step not only to facilitate these operations later but also to remove the pressure to that of the atmosphere through a pressure-removing tank at the maximum of 50 kg/cm$^2$ without breaking the wood material in accordance with the type of material treated and its interior structure, is effective in making possible the treatment of injection at the high pressure of 50 kg/cm$^2$. Therefore, injecting treating liquid into the raw wood materials up to the heart wood, which was very difficult using the conventional methods, and injecting treating liquid sufficiently to the central portion of the stone material, which injection itself was not carried out using the conventional methods, become possible. Furthermore, in injecting treating-liquid into the material, the treatment is possible at the normal temperature (0° to 40° C.). As a result, this is also effective in the efficiency of work, because such extra work can be omitted, as creosote treatment that treating liquids are injected after heat-treated up to about 90° C., or making the injection easy beforehand by heat-treating and boiling the material.

Accordingly, the wood material has greatly increased rot resistance, insect resistance, ant resistance, and mold resistance increasing the life of the wood. In addition, injecting treating liquid, having no possibility of leaking, to the central portion prevents cracking from occurring for a long period of time, allowing a high dimensional stability to be obtained. Further, using a flame-resistant treating liquid therewith injects the treating liquid thoroughly to the central portion, so that the wood material treated by the present method has high flame resistance and dimensional stability, allowing it to be used in a variety of applications. In addition, by the present method, the possibility of injecting treating liquid is widened even to many kinds of wood which had been regarded as difficult to inject and therefore which could not be treated, and thus the use of which had been limited. Moreover, the increased life of the wood material and the increase in kinds of wood which can be treated help stop the unplanned cutting of tropical forests, a problem in recent years, thereby making the method extremely useful from the viewpoint of forest protection.

The stone material can also be protected from damage caused by acid rain, so that its properties are not deteriorated. The outside walls of buildings can be protected from destruction caused by acid rain, a serious problem in the regions, such as Europe, which have many buildings built of stone material. In other words, according to the present invention it will not be necessary to prohibit the use of marble and other stone materials for the outside walls of buildings. The invention not only prevents damages to the stone material from occurring, but also is very useful for preserving a nation's culture and for environmental protection.

According to another aspect, the present invention also provides an apparatus for injecting treating liquid into wood materials and porous inorganic materials, the apparatus comprising a pressure vessel for accommodating a treated material in a sealed state, a depressurizer for depressurizing the pressure vessel, a liquid pressurizer of delivery constant type for pressurizing the pressure vessel under dynamic pressure, and a pressure-removing apparatus connected to the pressure vessel and containing a gas pressurized to the same pressure as the treating liquid in the pressure vessel, for releasing the gas to the atmosphere to thereby remove the pressure in the pressure vessel. Preferably, the pressure-removing apparatus may comprise a pressure-removing tank which is connected to the pressure vessel and is containing a gas pressurized to the same pressure as the treating liquid in the pressure vessel, and a pressure-removing valve which is connected to the pressure-removing tank and is opened and closed to remove the pressure in the pressure vessel through the pressure-removing tank.

Further, according to the present invention, in a method of injecting treating liquid into wood materials and porous inorganic materials by using a treating-liquid injecting apparatus which comprises a pressure vessel for accommodating a treated material in a sealed state, a depressurizer for depressurizing the pressure vessel, a liquid pressurizer of delivery constant type for pressurizing the pressure vessel under dynamic pressure, and a pressure-removing apparatus which is connected to the pressure vessel and containing a gas pressurized to the same pressure as the treating liquid in the pressure vessel, and is releasing the gas to the atmosphere to thereby remove the pressure in the pressure vessel, an expansion speed of the gases which are dissolved in the treating liquid inside the treated material accommodated in the pressure vessel is suppressed by controlling the pressure-removing apparatus so as to remove the pressure in the pressure vessel down to the atmospheric pressure for a period extended to at least 20 minutes, making the gas which has a smaller molecular structure than the treating liquid discharged from the treated material earlier than the treating liquid. Preferably, the pressure-removing apparatus may comprise a pressure-removing tank which is connected to the pressure vessel and containing a gas pressurized to the same pressure as the treating liquid in the pressure vessel, and a pressure-removing valve which is connected to the pressure-removing tank and is opened and closed to remove the pressure in the pressure vessel through the pressure-removing tank. In this case, an opening degree of the pressure-removing valve is controlled so that the pressure in the pressure vessel is removed down to the atmospheric pressure for a period extended to at least 20 minutes.

The apparatus prevents air expansion from breaking the material while pressure is being removed, allowing the treating liquid to be injected into the central portion of the material.

BRIEF DESCRIPTION OF THE DRAWINGS

FIG. 6 is a cross-section illustrating the condition of the wood material after it has been treated with the treating-liquid injecting method of the present invention, and that after it has been treated with a conventional treating-liquid injecting method;

FIG. 11 is a table illustrating the test data in the cases of FIG. 1 to 3; and

DESCRIPTION OF THE PREFERRED EMBODIMENTS

The embodiments of the treating-liquid injecting method of the present invention will be described with reference to the drawings.

Figure 1:
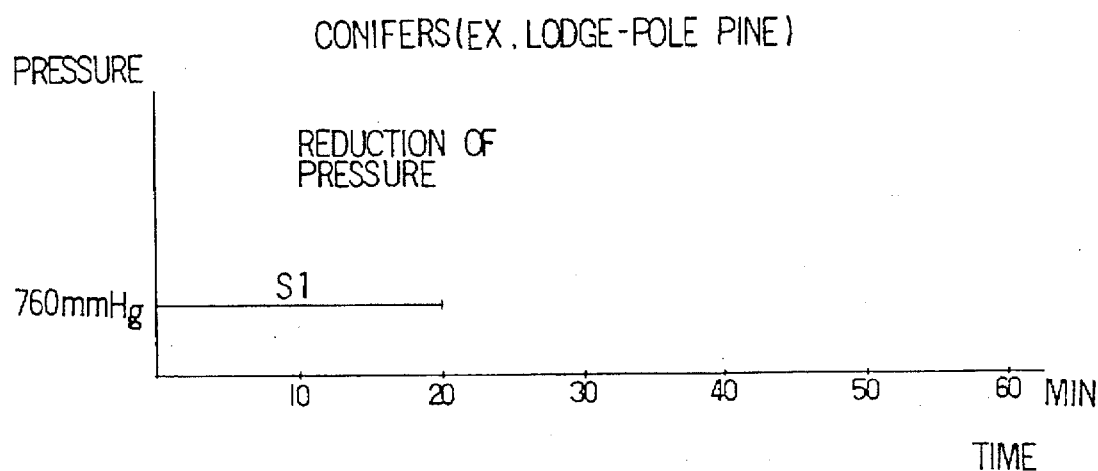
FIG. 1 illustrates graphs showing the reduction and application of pressure when the treating-liquid injecting method of the present invention is applied to conifers (lodge-pole pine)
Figure 4:
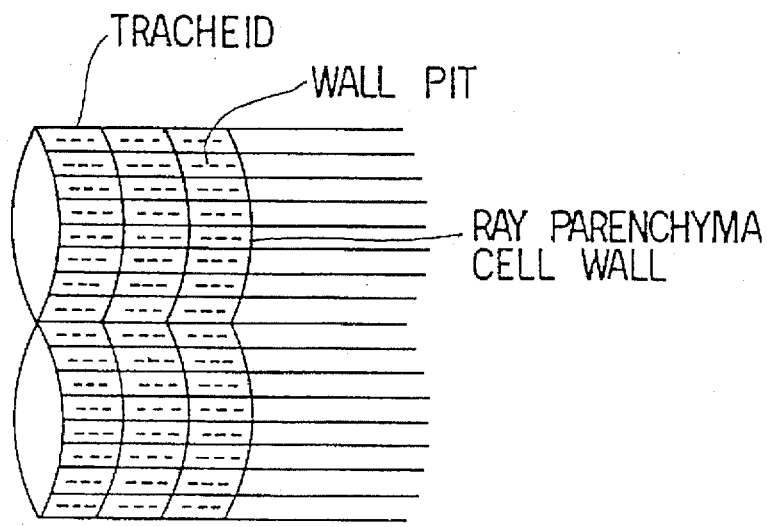
FIG. 4 illustrates the internal structure of the conifer.
Figure 5:
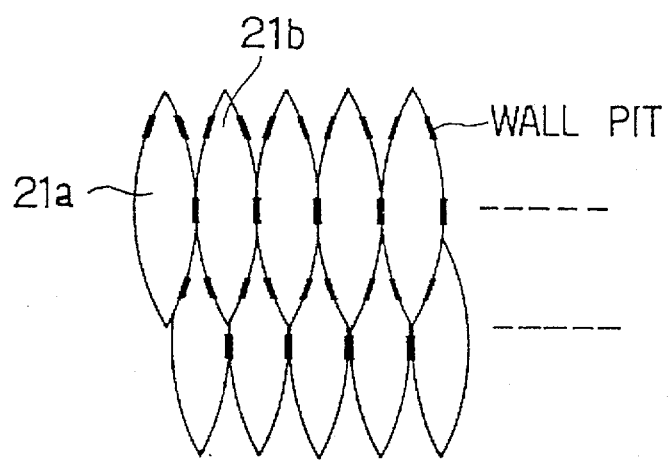
FIG. 5 illustrates the internal structure of the conifer.
Figure 7:
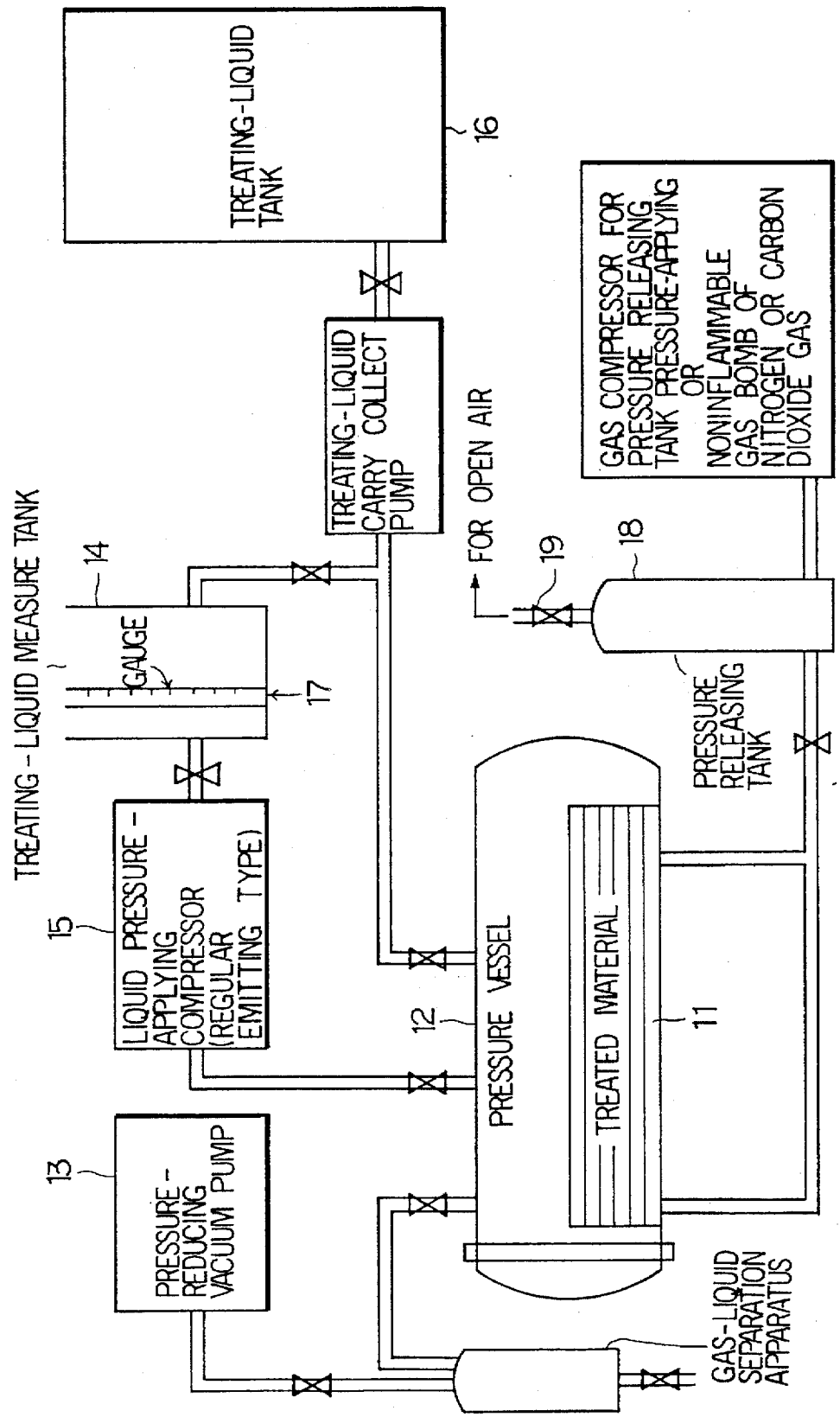
FIG. 7 is a block diagram illustrating the arrangement of the treating apparatus for implementing the method of the present invention.
Figure 8:
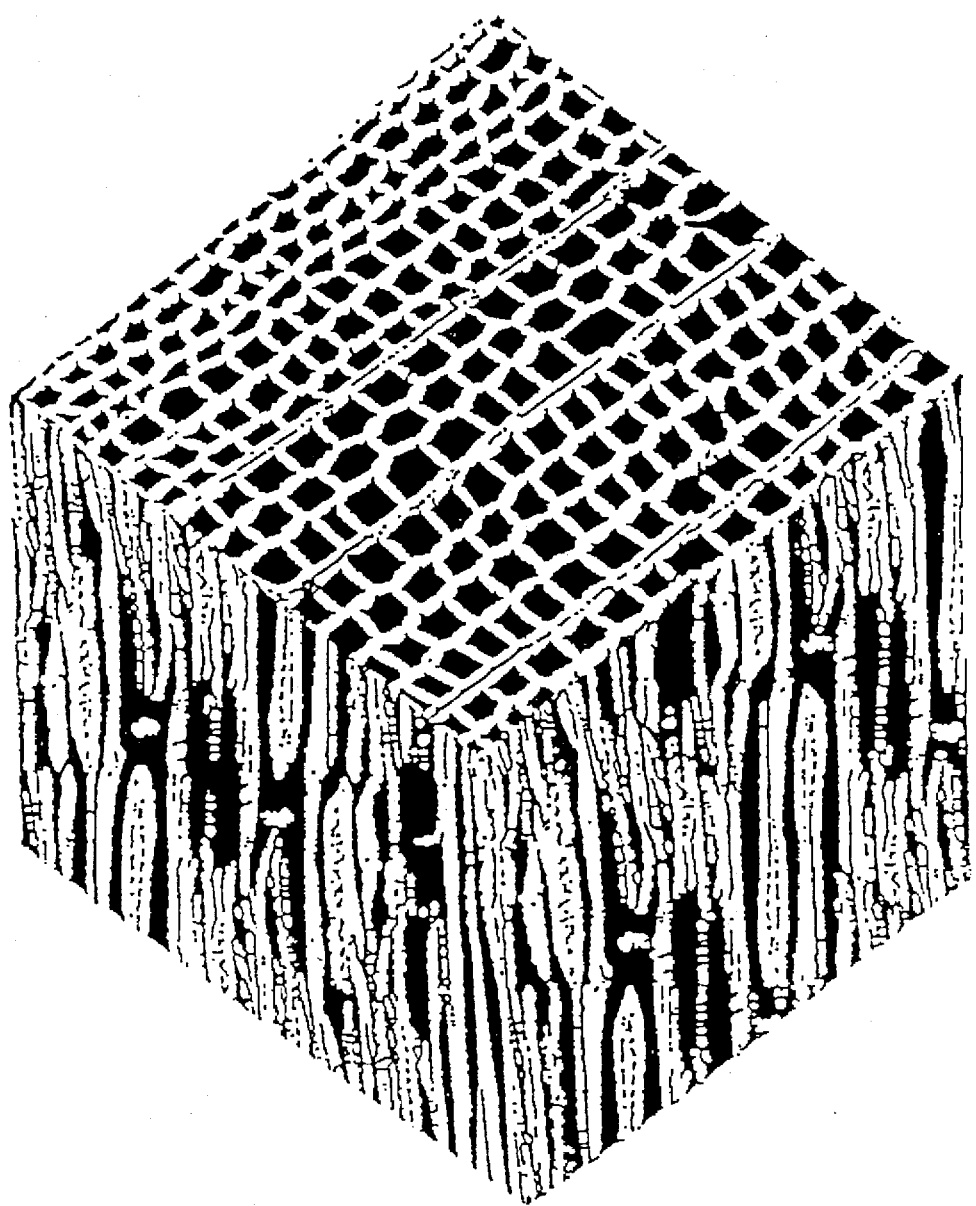
FIG. 8 is an enlarged sectional perspective view illustrating the structure of the wood material.
Figure 10:
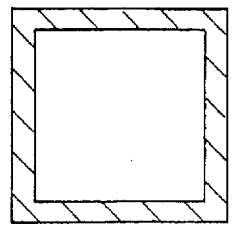
FIG. 10 illustrates the injection depth of the treating-liquid when the treating-liquid injecting method of the present invention is applied.
Figure 10:
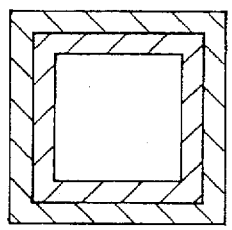
Figure 10:
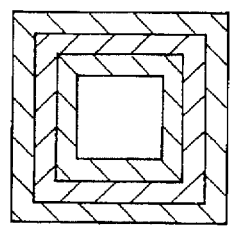
Figure 10:
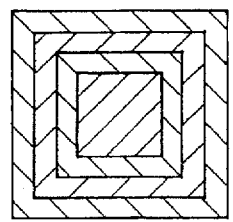

FIG. 1 shows graphs showing the reduction, application and removal of pressure in the first embodiment of the present invention when the method is used to inject the treating liquid into the conifer. Further, FIG. 1 is the illustration of the lodge-pole pine treated with injection. FIGS. 4 and 5 each illustrate the structure of the conifers. FIG. 6 compares the condition of the wood material after it has been treated using the treating-liquid injecting method of the present invention, and after it has been treated using a conventional treating-liquid injecting method. FIG. 7 is a block diagram showing the arrangement of the apparatus used for implementing the present method. FIG. 10 illustrates the injection depth of the treating liquid when the present invention is applied. In the present invention, the treated material 11 which is stored in a pressure vessel 12 is treated as follows: first, the pressure is reduced by a pressure-reducing vacuum pump 13; next, from a treating-liquid reservoir 16 via a treating-liquid measuring reservoir 14, the treating liquid is injected with the application of pressure by a liquid pressure-applying pump 15 of delivery constant type. Then, the pressure is removed from the inside of the pressure vessel 12 via a pressure-removing valve 19 and a pressure-removing tank 18.

The conifers generally have the structures shown in FIGS. 4 and 5. For this reason, it is necessary to destroy the ray parenchyma cell walls and aspirated pit-pairs to inject the treating liquid to the central portion. In the present method, the pressure is gradually applied from a low pressure to the material to be treated, so that the pressure difference between the internal and external portions of the wood material is maintained, which is large enough to destroy the torus 3, but not too large to deform the wood material. Each torus 3 is then destroyed by the pressure of the treating liquid, allowing the liquid to permeate sufficiently to the internal portion of the wood material.

First, after the treating liquid is injected into the surface cells (both cells whose cross-section is exposed to the surface and which are near the surface), the ray parenchyma cell walls at the outermost portion and the aspirated pit-pairs are destroyed, and then the pressure in the tracheid 21a is made equal with the external pressure. The pressure in the tracheid 21b, 21c, and the like is made equal with the external pressure as each torus is successively destroyed to those in the heart wood. In this case, the pressure is transmitted through very narrow gaps or small holes. Accordingly, it is necessary to increase the pressure for higher efficiency, but a sudden increase in pressure causes the material to become thinner and become deformed. Consequently, in the present invention the pressure is increased successively in steps so as not to thin and deform the material.

In the pressure-reducing step of the present invention, a treated material 11 is stored and sealed in a pressure vessel 12 comprising the apparatus illustrated in FIG. 7 (step 1 of FIG. 1, which will be abbreviated to S1 hereafter). Then as shown in FIG. 1, the pressure of the material is temporarily reduced to 760 mmHg by a pressure-reducing vacuum pump 13, with the material maintained at this pressure for about 20 minutes, in order to remove as much air from the material as possible.

The depressurizing process is not limited to the pressure of −760 mmHg, but may be performed under the atmospheric pressure or below. For conifers, the pressure-reducing process itself is not necessarily required. Although the pressure level may be at the atmospheric pressure or below, a very long treatment time which is in excess of the practical range would be needed unless the treated material is depressurized down to −600 mmHg or below. On the other hand, if the treated material is depressurized down to −600 mmHg or below, the treatment time would be shortened, but it would be required to improve a sealing ability of the equipment and the performance of the vacuum pump, resulting in poor economy. If no pressure-reducing process is performed, it would be required to take a longer time for each of subsequent steps because of the effect of gases existing in the treated material. From the balance between the treatment time and the necessary equipment, therefore, this embodiment employs the pressure-reducing process under −760 mmHg as the pressure-reducing step.

The next step is the pressure-applying step. In the initial pressure-applying/injecting step, pressure is applied on the material at between 0 kg/cm$^2$ and 10 kg/cm$^2$ by a liquid pressure-applying pump 15 of delivery constant type (S2). Besides, in the present embodiment, this step is done at between 0 and 5 kg/cm$^2$. In this case, each portion of the material in the pressure vessel 12 is subjected to the same pressure in accordance with Pascal's law. The material is maintained at this pressure for about 20 minutes. Unlike a pump of pressure constant type which has been conventionally used for injection under pressure, this liquid pressure-applying pump 15 of delivery constant type operates in such a manner that if the setting pressure is set to 5 kg/cm$^2$, for example, the pump continuously supplies the treating liquid at a certain flow rate under pressure in the range of 0 kg/cm$^2$ to 5 kg/cm$^2$ to the pressure vessel 12. When the interior of the pressure vessel 12 reaches the setting pressure, the pump throttles the delivery rate so as to maintain the setting pressure. The liquid pressure-applying pump 15 of delivery constant type is also different from the pump of pressure constant type in that a return pipe for returning the treating liquid from the pump to the tank to remove the pressure excessively applied is not provided.

In this embodiment, when the pressure vessel 12 is filled with the treating liquid and the liquid pressure-applying pump 15 of delivery constant type still further continues to supply the treating liquid, the pressure in the pressure vessel 12 is raised because the treating liquid supplied to the pressure vessel 12 has no exit to escape therethrough. As the pressure rises, the treating liquid is injected into the treated wood material. At the same time, ray parenchyma cell walls and wall pits of the treated material are broken. The injection of the treating liquid and the destruction of the ray parenchyma cell walls mean that the volume of the pressure vessel 12 is essentially increased, and hence the pressure in the pressure vessel 12 is reduced. In response to a pressure drop, the treating liquid is further injected into the treated wood and the pressure is further raised. This pressure rise causes another injection of the treating liquid and another destruction of the ray parenchyma cell walls. Thereafter, the process is continued while the pressure is reduced and then raised. Thus, in this embodiment, the pressure for pressurization is gradually raised with repeated up and down of the pressure. When the pressure for pressurization reaches the setting pressure, the delivery rate of the treating liquid is throttled so as to maintain that pressure. Upon no further injection being allowed under that pressure, the treating liquid stops movement toward the pressure vessel 12 and the pressure for pressurization ceases to rise. The process is no longer progressed in such a condition and, therefore, the pressure for pressurization is raised to a next stage. Stated otherwise, in this embodiment, the treating liquid is moving in the pressure vessel 12 at all times to create dynamic pressure therein, and the treating liquid is injected into the treated material under such dynamic pressure.

By contrast, in the conventional pump of pressure constant type, when the setting pressure of 5 kg/cm$^2$, for example, is reached, movement of the treating liquid from the pump to the pressure vessel is stopped, creating static pressure in the pressure vessel. In other words, the pressure is linearly raised and comes to a standstill at the setting pressure. Accordingly, the injection of the treating liquid is harder to develop than the injection thereof under dynamic pressure like this embodiment. Furthermore, when the interior of the pressure vessel reaches the setting pressure, the valve is switched to return the treating liquid from the pump to the tank through the return pipe for removing the pressure excessively applied. Because of this valve switching operation, it is difficult to make control to supply the treating liquid again to the pressure vessel 12 immediately in response to a small pressure change in the pressure vessel 12. On the contrary, in this embodiment using the pump of delivery constant type, since the pressure vessel 12 has no exit to escape therethrough and the pump is operating at all times, urging the treating liquid to be delivered, the treating liquid can be resupplied immediately in response to pressure change. A pressure of 0 to 10 kg/cm$^2$ is large enough to destroy each torus 3 and the like. As a result, although when the material is maintained at this pressure with the treating liquid being injected into the surface cells, not all of the ray parenchyma cell walls and aspirated pit-pairs are destroyed, a portion of them is destroyed, allowing pressure to be transmitted to the central portion. At this relatively low pressure of a maximum of 10 kg/cm$^2$, the wood material itself is not deformed. The initial pressure-applying/ injecting step which uses the pump of delivery constant type is one of major features of the present invention. By carefully performing this step for an extended time, the treating liquid penetrates into the wood core, and the applied pressure is also transmitted to the wood core, enabling the treating liquid to be effectively injected in the subsequent treating-liquid injecting step. Thus, this step is not just a first stage of the subsequent stepwise pressure application, but has a meaning as a pre-process for the subsequent stepwise pressure application under high pressure.

On the other hand, this step is required to be carried out under such a level of pressure as the treated material will not be destroyed. Theoretically, therefore, the pressure applied in this step can be raised up to the limit pressure until which the treated material is not destroyed, i.e., 15 kg/cm². However, this step is carried out below 10 kg/cm², i.e., lower than the limit pressure, in the present invention. The reason is as follows. 15 kg/cm² represents the limit pressure at which destruction of the treated wood is visually confirmed. Looking at the material on a microscopic scale, there occurs collapse of the wood when in excess of 10 kg/cm². If the wood is collapsed, the treating liquid is not injected into the cells of the collapsed region, and consequently the portions not filled with the treating liquid are left in the material material. If the process comes into the subsequent treating-liquid injecting step under such a condition, the non-injected portions of the material cannot withstand the high pressure applied in the treating-liquid injecting step and thus the wood would be destroyed, because the non-injected portions are not strengthened by the treating liquid and the applied pressure is not transmitted to the interior of the material. In the present invention, therefore, a maximum value of this step is set to 10 kg/cm². Particularly, in this embodiment, the maximum value is set to 5 kg/cm² with a sufficient allowance.

The next step is the treating-liquid injecting step. In the present embodiment, as shown in FIG. 1, the pressure is increased stepwise from a pressure of 0 to 5 kg/cm² of the initial pressure-applying/injecting step until the final 45 kg/cm² stage of pressure application (S3–S6). In this embodiment, the pressure is increased to 15 kg/cm², 25 kg/cm², and 45 kg/cm². The final applied pressure can be set to 50 kg/cm² at maximum. Depending on an improvement of the pressure resisting equipment, the final applied pressure can be set to higher pressure, e.g., 70 kg/cm². However, according to the method of the present invention, since the treating liquid can be injected into the center for almost all kinds of trees under the pressure of up to 50 kg/cm², applying higher pressure than 50 kg/cm² is meaningless. Note that the maximum value of 50 kg/cm² represents the pump setting pressure and of course includes an error of about 10%. Accordingly, when the final applied pressure of 45 kg/cm² is applied in this embodiment, the pressure of approximately 50 kg/cm² may be in fact applied to the treated wood.

Further, the maximum applied pressure is changed to an appropriate value depending on the kind of the wood material. Specifically, for lodge-pole pine into which it is hard to inject the treating liquid, the maximum applied pressure is set to 45 kg/cm² like this embodiment, but for Japan cedar into which the treating liquid is easily injected, the maximum applied pressure of 30 kg/cm² is sufficient.

First, the pressure is increased 6 to 15 kg/cm² (S3). Since a pressure of 5 kg/cm² has been applied in the initial pressure-applying/injecting step (S2), there is a relative pressure difference of 1 to 10 kg/cm² between the internal and external portions of the wood material at the time when the pressure is increased to 15 kg/cm². Though depending on the type of wood material, the torus 3 is usually destroyed when a pressure of 2 to 5 kg/cm² is applied to it. Accordingly, in the first stage of the treating-liquid injecting step, a greater number of aspirated pit-pairs, mainly those near the outer portion of the wood material, are destroyed. The material is again maintained at 6 to 15 kg/cm² for about 20 minutes. Here the pressure inside the pressure vessel 12 rises with up and down between 6 and 15 kg/cm² to 15 kg/cm² which is provided, keeping the inside of the vessel unfixed in pressure. For this reason, in the same way as it is described above, the pressure is transmitted through destroyed ray parenchyma cell walls and aspirated pit-pairs, allowing the wood material to be subjected to a pressure of 15 kg/cm² to its inner portion.

In the treating-liquid injecting step, the pressure is further increased when appropriate while in each pressure-applying stage the material is maintained at a particular pressure for a certain period of time. That is, in the present step pressure is further applied to the wood material at 16 to 25 kg/cm², 26 to 35 kg/cm², and 36 to 45 kg/cm², each for 20 minutes until the final stage of pressure application (S4–S6). The relative pressure difference which occurs between the internal and external portions of the wood material in each stage successively destroys the ray parenchyma cell walls and the aspirated pit-pairs.

FIG. 10 shows successive changes in injection depth of the treating liquid resulted when the pressure is stepwisely raised as mentioned above. FIG. 10(a) shows the injection depth of the treating liquid in the initial pressure-applying/injecting step. For the conifer, the treating liquid is first injected into cells existing in the wood surface. The reasons are that cell sections are exposed to the surface of the conifer, enabling the treating liquid to be injected into the surface cells, and that the cells to which the treating liquid has been injected have higher pressure resistance than the cells to which the treating liquid has not yet been injected. The latter fact is attributable to that the volume of liquid is less changed than the volume of gas with respect to pressure. Therefore, the cells to which the treating liquid has been injected are not brought into cell rupture even when pressure is applied thereto externally, because a volume change of the injected liquid is small. On the other hand, for the cells to which the treating liquid has not yet been injected, gases in the cells are compressed upon the pressure applied thereto externally to such an extent that cell walls can no longer resist a change in the volumes of compressed gases, and the cells are ruptured even with the same pressure applied. Stated otherwise, to apply pressure not lower than 15 kg/cm² in the subsequent treating-liquid injecting step, it is required to inject the treating liquid into the surface cells so that those cells have sufficient pressure resistance. Thus, the initial pressure-applying/injecting step in the present invention is not just a first stage of the stepwise pressure application, but an important step for enabling the subsequent high-pressure process to be achieved. Under the pressure applied in the initial step, once a certain amount of treating liquid is injected, the treating liquid cannot be injected in the amount exceeding the above one, even if the injection is continued for an extended time. Therefore, the process is advanced to a next step for raising the pressure by one stage.

FIG. 10(b) shows the first stage of the treating-liquid injecting step in which the pressure is raised to inject the treating-liquid into a deeper region than in the previous step. But, because the pressure reaches a limit in this stage too, the pressure is further raised by one stage.

Likewise, in FIG. 10(c), the treating liquid is injected into an ever deeper region than in the previous stage, but the pressure reaches a limit. Then, the interior of the pressure vessel is pressurized to the final applied pressure.

Under the final applied pressure, the treating liquid is injected into the wood core (FIG. 10(d)). Whether the treating liquid has been injected into the wood core or not is judged by comparing the amount by which the treating liquid can be injected on calculations with the amount by which the treating liquid has been actually injected. On this occasion, the amount by which the treating liquid can be injected on calculations is determined by subtracting the volume of wood portion and the volume of contained water from the total volume of the wood material.

As described above, wood materials are usually deformed when a pressure of 15 kg/cm$^2$ is applied thereto. The materials are, however, deformed due to shock arising from a pressure difference which is caused by a sudden application of pressure from no pressure to 15 kg/cm$^2$. Accordingly, if the pressure is applied in steps to the wood material as it is in the present invention, the wood material is not easily deformed even when the final pressure applied thereto exceeds 15 kg/cm$^2$.

In the present invention, in each stage pressure is applied for a predetermined time so that the internal portion of the wood material is subjected to the pressure of a particular pressure-applying stage. Therefore, even if, for example, a pressure of 25 kg/cm$^2$ is applied, the pressure increase during pressure application is merely the relative pressure difference between the internal and external portions of the wood material. That is, the pressure which the wood material experiences is merely 10 kg/cm$^2$ (25 kg/cm$^2$ minus the previous applied pressure of 15 kg/cm$_2$), causing no deformation.

Accordingly, according to the present invention the treating-liquid injecting step carried out stepwise allows the aspirated pit-pairs and the like to be destroyed to those at the internal portion of the wood material, without deforming the wood material itself.

In each pressure stage, it is preferable that for the first few pressure application stages of up to about 15 kg/cm$^2$ the material is maintained at a particular pressure for a relatively long period of time of 10 minutes or more, while the length of time can be shortened thereafter.

Pressures in the initial pressure-applying/injecting step and the treating-liquid injecting step, the pressure difference for each stage, and the length of time the material is maintained at a certain pressure are naturally set at different values in accordance with the kind, type and dimensions of the wood material. For example, the pressure difference is made large when a large pressure is required to destroy the torus 3, and the material is maintained at a certain pressure for a longer period of time when time is required to equalize the pressure to the inner portion of the wood material.

In the treating-liquid injecting step, the treating liquid is injected into the material to be treated with a liquid pressure-applying pump 15 of delivery constant type and allowed to spread throughout the material under a certain pressure. At this time, the gases remaining in the tracheid 21 of the material and the gases remaining in wood cells are first compressed to minimum volumes. Then, based on the Henry's law, those gases finally dissolve in the treating liquid. In the prior art process, since the applied pressure is set to an insufficient level from the relation to destruction of the wood material, pools of gases are produced in the treated wood. At the time the pressure applied externally is in balance with the pressure inside the treated wood, there occurs a condition in which the pools of gases function like air springs. Accordingly, these air springs prevent injection of the treating liquid, making it difficult for the treating liquid to penetrate into the core of the treated wood. In the present invention, however, the problem of destruction of the material is solved and the high-pressure process can be performed at the final applied pressure of 5 kg/cm$^2$. The high-pressure process enables the gases in the treated wood to be dissolved in the treating liquid based on the Henry's law, and hence the treating liquid can be injected into the core of the treated material.

On the other hand, after injecting the treating liquid by applying pressure as described above, the treated wood must be released from the pressurized state. However, if the raised pressure is suddenly removed, the gases dissolved in the treating liquid based on the Henry's law may be abruptly expanded, causing the wood material itself to be destroyed. More specifically, since the volume change of liquid is much smaller than the volume change of gas with respect to pressure, the pressure in the pressure vessel 12 would be suddenly dropped if the treating liquid is returned at a time from the pressure vessel 12 filled with the treating liquid to the treating-liquid reservoir 16. Correspondingly, the gases dissolved in the treating liquid inside the treated material are so abruptly expanded as to destroy the material. For conifers contrary to that the wood is thinned or deformed if suddenly subject to the externally applied pressure of 15 kg/cm$^2$ or higher, the wood is destroyed upon a sudden pressure removal. In this embodiment, the treating liquid inside the treated wood contains the gases dissolved therein under the pressure of 45 kg/cm$^2$. Accordingly, if the treated material is suddenly returned to the atmospheric pressure, it would be destroyed from the inside by forces corresponding to 45 kg/cm$^2$. In this embodiment, therefore, it is required to control the expansion speed of the gases dissolved in the treating liquid for preventing the wood material from being destroyed.

For that reason, the present invention particularly includes a pressure-removing step (S7) and a pressure-removing tank 18 in the treating apparatus. The pressure-removing tank 18 is previously filled with a noninflammable gas which is supplied from, e.g., a gas pump or a nitrogen or carbon dioxide gas bomb and is pressurized to the same level as that in the pressure vessel 12. Then, the gas is discharged little by little from the pressure-removing tank 18 through a pressure-removing valve 19 so that the pressure in the pressure vessel 12 is gradually lowered. At this time, the pressure in the pressure-removing tank 18 is lowered at the same rate as that at which the pressure in the pressure vessel 12 is lowered. Accordingly, the expansion speed of the dissolved gases in the treated wood can be controlled depending on an opening degree of the pressure-removing valve 19. With the control of the pressure reduction rate, it is possible to expel the gas which has a smaller molecular structure than the treating liquid out of the treated wood earlier than the treating liquid, and to leave the treating liquid sufficiently in the treated wood.

The condition of the wood material treated using the treating-liquid injecting method of the present embodiment, and that treated using a conventional treating-liquid injecting method are shown in FIG. 6 for comparison. A water-soluble dye was injected using the present method and a conventional method, and then each treated wood material was cut for comparison (Japanese cedar and radiator pine heart wood having a water content of 55% and measuring 20×20×100 cm were used). As is apparent from FIG. 6, the wood material treated by a conventional method only permits a small amount of treating liquid to enter from the cut end face, and almost no treating-liquid is injected from the other faces. That is, in spite of the injection from the cut end face, the portion near the surface 13 alone was deeply colored, and as regards the interior, only the vessels were colored within 5 cm or so from the surface, or with the color becoming thin gradually. On the other hand, according to the present method the treating liquid is injected from any direction, from the cross-grain, straight-grain, and the like, and besides, though the surface was a little deep, the light and shade of the color was hardly seen in the interior. That is, according to the present method the ray parenchyma cell walls and the aspirated pit-pairs in the material are destroyed for injecting the treating liquid, so that the treating liquid is consistently injected not only into the material's surface but to its central portion, thereby posing no problems when heart wood is used as the material to be treated.

Figure 9:
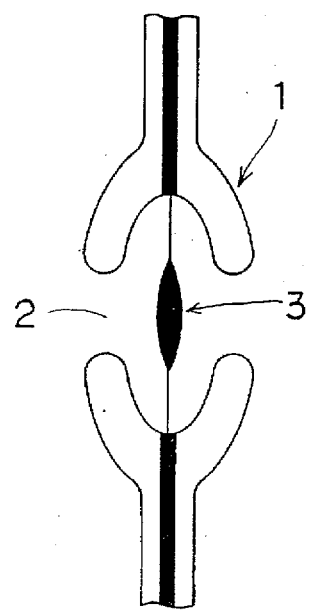
FIG. 9 is a cross-section of the wall pits in the wood material structure.
Figure 9:
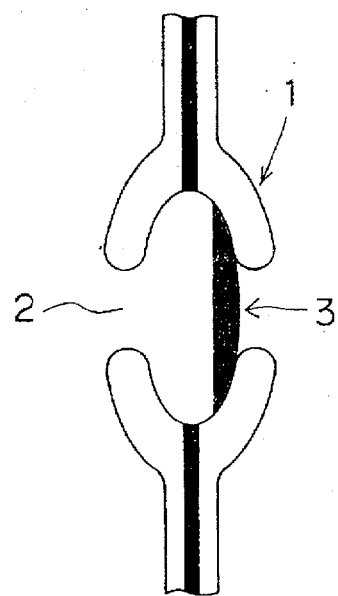
Figure 12:
FIG. 12 illustrates cells of the wood material before and after the treatment of the present invention is carried out.
Figure 12:

FIG. 12 shows the conditions of cells of the treated wood material before and after the injection of the treating liquid in the present invention. FIGS. 12(a) and 12(b) show the conditions of wall pits before the injection, whereas FIGS. 12(c) and 12(d) show the conditions of wall pits after the injection. FIGS. 12(a) and 12(c) show the conditions of cells of sap wood, whereas FIGS. 12(b) and 12(d) show the conditions of cells of heart wood. With the injection, the conditions are changed from FIG. 12(a) to FIG. 12(c), from FIG. 12(b) to FIG. 12(d). Note that FIGS. 12(a) and 12(b) correspond respectively to the states of FIGS. 9(a) and 9(b) when viewed from the outer side. As seen from FIGS. 12(c) and 12(d), the wall pits are broken in all wood region up to the core, by using the method of the present invention. It is thus shown that the treating liquid penetrates into the heart wood.

In this embodiment, the amount by which the treating liquid can be injected is calculated beforehand from the water content, the vacancy rate, the weight and the volume of wood. Taking into account the errors due to impurities, 70 to 80% of the calculated injectable amount is set as the amount by which the treating liquid can be practically injected. FIG. 11 shows experimental results including data such as the specific weight before and after the treatment. In FIG. 11, (a) represents injection data for lodge-pole pine, (b) for red oak, and (c) for marble.

Here, the water content U can be expressed by:

$$U = \frac{GU - GO}{GO} \times 100$$

where GU=weight of wood, and GO=volume of wood×total dry specific weight of wood The vacancy rate C can be expressed by:

$$C = 1 - \frac{ro}{1.5(\text{true specific weight})} \times 100$$

where ro=total dry specific weight of wood, and 1.5=true specific weight of wood The weight A of water contained in the wood can be expressed by:

$$A = GU - \left( GV \times \frac{100 - C}{100} \times 1.5 \right)$$

Therefore, the injectable amount B can be determined below using the weight A of water that is converted into volume:

$$B = (GV \times C) - A$$

where GV=volume of wood

In consideration of an effect of impurities such as rosin and tylosis,

B×(70 to 80%)

is set as the practical injectable amount.

The treating liquid can be injected until reaching the practical injectable amount thus calculated. While confirming a reduction of the treating liquid in the injected-amount calculating tank 17, the treating liquid is injected until reaching the practical injectable amount. At this time, if the injected amount does not reach the preset amount, the pressure-applying time at the final applied pressure is extended so that the treating liquid is injected into the wood core.

To describe it in more detail with reference to FIG. 11(a), since the calculated injectable amount is 52.5 l, the practical injectable amount is about 37 l. On the other hand, the actual injectable amount is 31 l. This value of 31 l is within the range where it can be thought that injection of the treating liquid has been completed substantially to 100%, taking into account different wood properties (heart wood or sap wood) and variations in individual wood materials. Particularly, since this embodiment employs heart wood for which injection of the treating liquid is hard, it is reasonable to think that the treating liquid has been sufficiently injected into the wood core, although the actual injected amount is about 6 l less than the practical injectable amount. For comparison, in the conventional simple pressing method, the treating liquid only less than 5 l could be injected into lodge-pole pine under the same wood conditions even with a heating process applied. According to the present invention, the treating liquid can be injected in the amount 6 or more times as much as the conventional method at the normal temperature as described above.

A return of the treating liquid after the pressure removal in FIG. 1 is presumably ascribed to that some treating liquid is pushed out by the dissolved gases, and that the wood compressed under pressure increases its volume when returned to the atmospheric pressure.

Usable liquids to be injected include vegetable oil and mineral oil emulsified and made water-soluble by cationic surfactants to which are mixed antiseptics, insecticides, ant killer substances, and mold retarders. The treating liquids to be injected, which are cationic, combine ionically with the anionic wood material to prevent leakage from the wood material, making them suitable treating liquids.

Further, cation-base pharmaceuticals have a strong sterilization effect as well known, and DDAC as one kind of cation-base pharmaceuticals is used as a wood preservative over the world. It is also known that oil has an effect of preventing cracks or distortions of wood. By using oil and any of cation-base pharmaceuticals in a combined manner, it is possible not only to develop a preservation effect, but also prevent cracks or distortions as defects of wood, thereby enabling wood to be more effectively utilized. In addition, an oil component which has become water-soluble due to the combined use is advantageous in that its emulsified state is broken with drying of wood, allowing only moisture to evaporate, and the remained oil component develops a water repellent effect and also contributes to a preservation effect. In this case, the remained oil component is less dissolved in water again, because it is cationic and has been once separated from the emulsified state. Furthermore, a treating liquid prepared by emulsifying oil in a cation-base surfactant has a small grain size and hence can be easily injected into wood. Compared to water-soluble glycols used as treating liquids, these treating liquids prevent leakages from occurring and have better dimensional stability and the like over a longer period of time. In addition, emulsifying them by non-ionic and anionic surfactants and adding antiseptics thereto allow the same effects to be obtained. Further, since in the present method the treating liquid can be injected to the central portion of the wood material, a treated material having a higher flame resistance than the conventional treated materials can be obtained by the injection of flame retarders.

Figure 2:
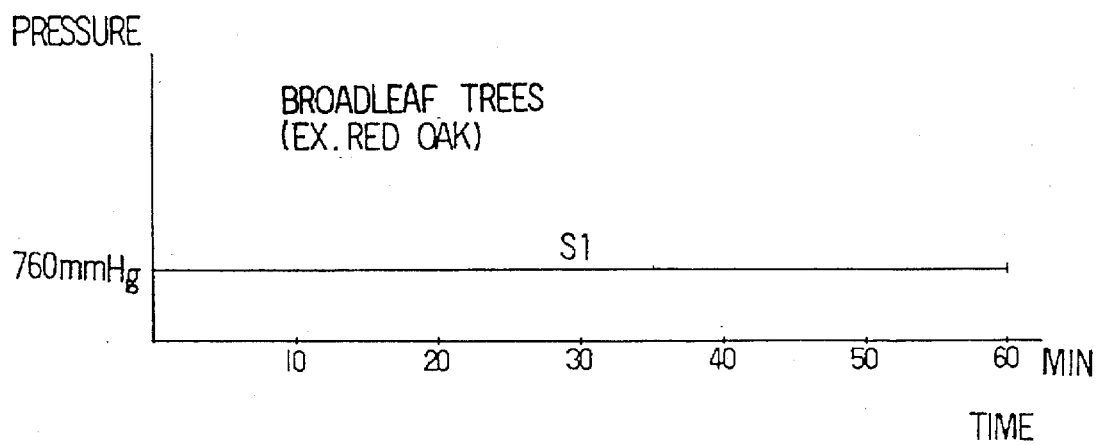
FIG. 2 illustrates graphs showing the reduction and application of pressure when the treating-liquid injecting method of the present invention is applied to broadleaf trees (red oak)

A second embodiment of the treating-liquid injecting method related to the present invention will be hereunder described. The second embodiment is a method for injecting the treating liquid into broadleaf trees (red oak). FIG. 2 illustrates graphs showing the reduction and application of pressure during the treatment.

Compared with the aforementioned conifers, broadleaf trees usually have many thick vessels which pass water. Therefore, it may be seen that these vessels can be used to easily inject the treating liquid. However, these vessels actually contain a large amount of impurities such as tylose. Accordingly, applying pressure all at once causes the impurities to get clogged in the vessels, preventing injection of the treating liquid. For this reason, as regards the present invention, in the initial pressure-applying/injecting step, to make the treating liquid go through the vessels and consequently to transmit equal pressure of the liquid are followed by to inject the treating liquid to the central portion of the material, by applying a relatively low pressure which does not cause the impurities to get clogged in the vessels over a long period of time. Thus here too, the initial pressure-applying/injecting step of the present invention is of different significance from a mere first step of the stepwise pressure application.

The present method sets the pressure-reducing time at more than 30 minutes at least, preferably 60 minutes which is longer than that set for the conifers as shown in FIG. 2, in view of the fact that the broadleaf trees contain more elements in their vessels compared to the conifers, which makes it necessary to minimize the influence of the gas in the vessels occurring during pressure application by removing as much gas in the vessel as possible (S1).

Even in the following pressure-applying step, a relatively low pressure of about 0 to 10 kg/cm$^2$ is applied, so that the clogging in the vessels does not occur. The pressure-applying time is set at 30 minutes, which is longer than it is for the conifers (refer to S2). In this embodiment, the treatment is carried out under 0 to 5 kg/cm$^2$ in the same manner as the above-described case for conifers. This is, in addition to the foregoing reasons, because tracheids are more apt to be clogged in the case of broadleaf trees. Accordingly, it is important in the case of broadleaf trees to perform this step under low pressure for a long time. Accordingly, the treating liquid being made through the vessels in advance, the vessels can be set at a certain pressure, without being hampered by vessel clogging. After a low pressure is applied for a long period of time, the pressure is applied in steps at 6 to 15 kg/cm$^2$ for 10 to 20 minutes, 16 to 30 kg/cm$^2$ for 20 to 30 minutes, 31 to 45 kg/cm$^2$ for 30 minutes and so on (S3–S5). Besides, concerning the final pressure application, as mentioned above, it does not matter whether pressure is applied until 50 kg/cm$^2$ or at lower values than 45 kg/cm$^2$ according to the kind of the wood material. In this case, the pressure on the broadleaf trees can be increased in a fewer number of steps than for the conifers, since they have larger number of vessel elements. In the case of broadleaf trees therefore, the treatment is generally progressed like the following; as indicated by a dot line in FIG. 2, the time during which the low pressure is applied is long and, thereafter, the pressure is relatively quickly raised. Similarly, although the amount of treating liquid injected is moderately increased at the beginning, its gradient is quickly increased with a rise of the pressure. By contrast, in the case of conifers, the pressure and the amount of treating liquid injected are generally increased at a substantially uniform gradient, as indicated by a dot line in FIG. 1. After the treating liquid has been injected, the pressure is gradually removed using the pressure-removing valve 19 as described above (S6).

Obtained was the same result as those of the conifers that the treating liquid was injected to the central portion of the treated material. FIG. 11(b) shows these data. Furthermore, in the case of broadleaf trees as well as conifers, the pressure, the pressure difference, and the length of time the material is maintained at a certain pressure can be set at different values for each step in accordance with the kind, type and dimensions of the wood material.

Figure 3:
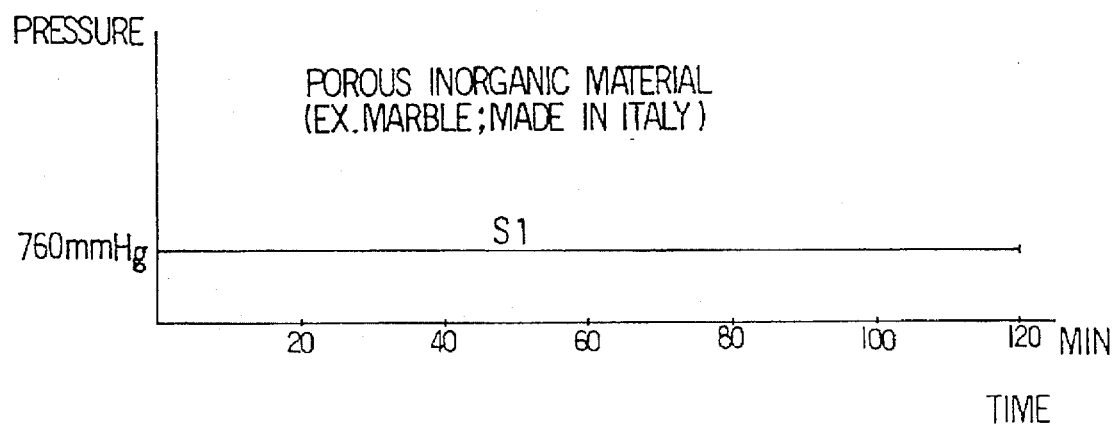
FIG. 3 illustrates graphs showing the reduction and application of pressure when the treating-liquid injecting method of the present invention is applied to stone material (marble made in Italy)

FIG. 3 illustrates graphs showing the reduction and application of pressure during material treatment in the third embodiment of the treating-liquid injecting method related to the present invention. The present embodiment is a method for injecting the treating liquid into porous inorganic materials such as stone material. In the present method, the time for reducing the pressure and the time for applying low pressure are made long. After the pressure is reduced and low pressure is applied, the pressure is increased at once to a high pressure, which allows injection of the treating liquid to the internal portion of the stone material.

Porous inorganic materials such as marble contain a large quantity of gas in their interior due to their structure. Accordingly, in the present method sufficient pressure-reducing time is taken so that the gas in the interior can be sufficiently removed (S1). In this case, it is desirable that the pressure-reducing time is longer than it is for the aforementioned broadleaf trees, therefore about 120 minutes.

Stone materials also contain a large amount of fine impurities or fine powder in their interior. Accordingly, as an initial pressure-applying/injecting step, in order to prevent clogging by these entities from occurring, a relatively low pressure of about 5 kg/cm$^2$ is applied for a longer period of time than for the wood material, for example for about 60 minutes (S2). This allows the material's interior to be at a certain pressure as is the case for the broadleaf trees. After low pressure is applied for a long period of time, the treating-liquid injecting step is carried out. In the present embodiment, unlike in the case of the wood material, a high pressure of 45 kg/cm$^2$ is applied at once, because the stone material is not easily deformed by pressure application (S3).

On the other hand, after injecting the treating liquid under high pressure, the pressure-removing valve 19 is used to gradually remove the pressure as described above (S4).

Accordingly, according to the methods of the present invention, the treating liquid is injected to the central portion of the material. A piece of 70×30×3 cm-marble (made in Italy) used as stone material was injected with a water-soluble dye and then cut. It was found that the marble was uniformly dyed to its central portion, thereby verifying that the injected treating liquid does reach the material's central portion. It goes without saying that in this case too, conditions of treatment are changeable according to the type of the material.

In the present method, using, for example, a Toa Kagaku's "Alone Water Shut" (trade name) whose major component is silane monomer further increases the treated stone material's resistance to acid rain. That is, the silane monomer in the base material chemically combines with the silanol and forms a layer highly effective in preventing water absorption, thereby protecting the stone material from damage caused by acid rain and the like. In addition, since the hair net pits in the stone material, particularly the marble, are not embedded, the stone material can be treated by taking advantage of its characteristics, without deteriorating the respiratory action of the marble.

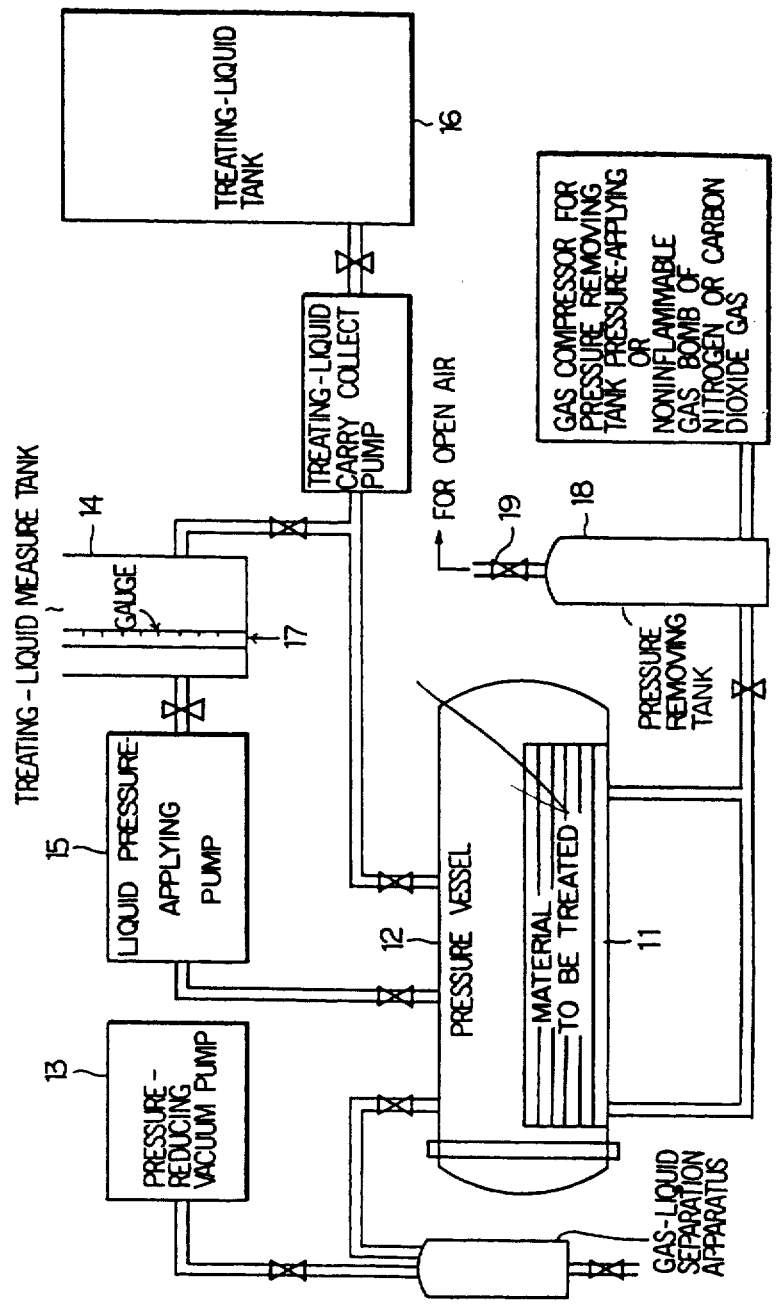

What is claimed is:

1. A method of destroying ray parenchyma cell walls and aspirated pit-pairs of a conifer wood material, and injecting a treating liquid into a conifer wood material comprising the steps of:
   a) an initial pressure-applying/injecting step of immersing said conifer wood material at ambient temperature in a treating liquid under an initial liquid pressure in the range of 1 to 10 $kg/cm^2$, and maintaining said liquid pressure for at least 10 minutes to inject said treating liquid into tracheid of said conifer wood material,
   b) a treating-liquid injecting step of increasing said liquid pressure on said conifer wood material with injected treating liquid at ambient temperature from said initial liquid pressure up to a final applied liquid pressure having a maximum value of 50 $kg/cm^2$ in a stepwise manner, comprising a plurality of pressure increases of 5 to 10 $kg/cm^2$ each, each said pressure increase being followed by maintaining the increased pressure for at least 10 minutes to further inject said treating liquid under pressure into said conifer wood material while dissolving any gases in said conifer wood material in said treating liquid, and
   c) a pressure-removing step of reducing the liquid pressure on said conifer wood material from said final applied pressure to atmospheric pressure over a period of at least 20 minutes to prevent said conifer wood material from being broken due to abrupt expansion of any gases dissolved in said treating liquid which is injected into said conifer wood material.

2. A method according to claim 1, further comprising, before said initial pressure-applying/injecting step, a pressure-reducing step of reducing gas pressure on the conifer wood material to less than atmospheric pressure, and maintaining the reduced gas pressure for at least 20 minutes to purge gases out of said conifer wood material.

3. A method of destroying ray parenchyma cell walls and aspirated pit-pairs of broadleaf wood, and injecting treating liquid into broadleaf wood comprising the steps of:
   a) a pressure-reducing step of exposing the broadleaf wood to a gas pressure no greater than atmospheric pressure, and maintaining the gas pressure for at least 30 minutes to purge gases out of said broadleaf wood,
   b) an initial pressure-applying/injecting step of immersing said broadleaf wood in a treating liquid at ambient temperature under a liquid pressure in the range of 1 to 10 $kg/cm^2$, and maintaining the liquid pressure for at least 20 minutes to inject said treating liquid into tracheid of said treated wood,
   c) a treating-liquid injecting step of increasing the liquid pressure of said broadleaf wood with injected treating liquid at ambient temperature up to a final applied liquid pressure having a maximum value of 50 $kg/cm^2$ in a stepwise manner, comprising a plurality of pressure increases of 5 to 20 $kg/cm^2$ each, each said pressure increase being followed by maintaining the increased pressure for at least 10 minutes to further inject said treating liquid under pressure into said broadleaf wood while dissolving any gases remaining in said broadleaf wood in said treating liquid, and
   d) a pressure-removing step of reducing the liquid pressure on said broadleaf wood from said final applied pressure to atmospheric pressure over a period of at least 20 minutes to prevent said broadleaf wood from being broken due to abrupt expansion of any gases dissolved in said treating liquid which is injected into said broadleaf wood.

4. A method of injecting treating liquid into a stone material comprising the steps of:
   a) a pressure-reducing step of exposing the stone material to a gas pressure no greater than atmospheric pressure, and maintaining the gas pressure for at least 60 minutes to purge any gases out of said stone material,
   b) an initial pressure-applying/injecting step of immersing said stone material at ambient temperature in a treating liquid under a liquid pressure in the range of 1 to 10 $kg/cm^2$ and maintaining the liquid pressure for at least 60 minutes to inject said treating liquid into cracks inside said stone material,
   c) a treating-liquid injecting step of increasing the liquid pressure of said stone material at ambient temperature up to a final applied liquid pressure having a maximum value of 50 $kg/cm^2$ in a single step, and maintaining the final applied pressure for at least 30 minutes to inject said treating liquid under pressure into said stone material while dissolving any gases remaining in said stone material in said treating liquid, and
   d) a pressure-removing step of reducing the liquid pressure on said stone material from said final applied pressure to atmospheric pressure over a period of at least 20 minutes to prevent said stone material from being broken due to abrupt expansion of any gases dissolved in said treating liquid which is injected into said stone material.

5. A method according to claim 1, 2, 3 or 4, wherein said initial pressure-applying/injecting step and said treating-liquid injecting step are carried out by using a constant volume pressure-applying pump, resulting in pressurization under dynamic pressure.

6. A method according to claim 1, 2 or 3, wherein said treating liquid is a cation-base treating liquid prepared by emulsifying plant oil or mineral oil with a cationic surfactant.

7. A method according to claim 4, wherein said treating liquid comprises a silane monomer.

8. An apparatus for injecting treating liquid into wood materials and porous inorganic materials comprising: a pressure vessel for accommodating a material to be treated in a sealed state, a depressurizer means for reducing gas pressure in the pressure vessel, a constant volume liquid delivery means for pressurizing the pressure vessel to a predetermined liquid pressure under dynamic pressure, and a pressure-removing means connected to the pressure vessel and comprising container means, means for pressurizing the container means with a gas at the predetermined liquid pressure, and means for releasing pressurized gas in the container means to atmosphere to thereby reduce the liquid pressure in the pressure vessel.

9. An apparatus according to claim 8, wherein said container means comprises a tank connected to said pressure vessel, and a said means for releasing comprises a valve connected to said tank and adapted to be opened and closed to reduce the liquid pressure in said pressure vessel.

10. A method of injecting treating liquid into wood materials and porous inorganic materials by steps comprising immersing a wood or stone material in a treating liquid in a treating liquid injecting apparatus which comprises a pressure vessel for accommodating a material to be treated in a sealed state, a depressurizer means for reducing gas pressure in the pressure vessel, a constant volume liquid delivery means for pressurizing the pressure vessel to a predetermined liquid pressure under dynamic pressure, and a pressure-removing means connected to the pressure vessel and comprising container means, means for pressurizing the container means with a gas at the predetermined liquid pressure, and means for releasing the pressurized gas in the container means to atmosphere to thereby reduce the liquid pressure in the pressure vessel, increasing the liquid pressure of the immersed wood or stone material, and subsequently reducing the liquid pressure, further comprising the step of controlling said pressure-removing means so as to reduce the liquid pressure in said pressure vessel to atmospheric pressure over a period of at least 20 minutes, thereby suppressing expansion speed of any gases dissolved in said treating liquid and discharging the gas from the immersed wood or stone material prior to said treating liquid.

11. A method according to claim 10, wherein said container means comprises a tank connected to the pressure vessel, and said means for releasing comprises a valve connected to the tank and adapted to be opened and closed to reduce the liquid pressure in the pressure vessel, further comprising the step of controlling said valve so that the pressure in the pressure vessel is reduced to atmospheric pressure over a period of at least 20 minutes.

12. A method according to claim 1, 3 or 4, wherein the final applied liquid pressure has a value of 30 to 50 kg/cm$^2$.

13. An apparatus for injecting treating liquid into wood materials and porous inorganic materials comprising:

a pressure vessel for accommodating a material to be treated in a sealed state;

a depressurizer means for reducing gas pressure in the pressure vessel;

a constant volume liquid delivery means for delivering a treating liquid to the pressure vessel and pressurizing the pressure vessel to a predetermined liquid pressure under dynamic pressure; and a pressure-removing means for the pressure vessel and comprising container means having therein a gas pressurized to the predetermined liquid pressure, fluid connection means between the container means and the pressure vessel and valve means for selectively venting the container means to atmosphere, whereby release of the pressurized gas to atmosphere reduces the pressure in the pressure vessel.

14. An apparatus according to claim 13, additionally comprising means for containing a treating fluid in fluid connection with the liquid delivery means.

15. An apparatus according to claim 14, additionally comprising a liquid measuring reservoir disposed between the treating fluid containing means and the constant volume liquid delivery means, and a means for throttling the liquid delivery means to maintain a constant pressure in the pressure vessel when the predetermined pressure is attained in the pressure vessel.

16. A method for injecting treating liquid into wood or stone material, comprising the steps of:

a) placing the wood or stone material in a pressure vessel of an apparatus comprising a pressure vessel for accommodating a material to be treated in a sealed state; a depressurizer means for reducing gas pressure in the pressure vessel; a constant volume liquid delivery means for delivering a treating liquid to the pressure vessel and pressurizing the pressure vessel to a predetermined liquid pressure under dynamic pressure; and a pressure-removing means for the pressure vessel and comprising container means having therein a gas pressurized to the predetermined liquid pressure, fluid connection means between the container means and the pressure vessel and valve means for selectively venting the container means to atmosphere, wherein release of the pressurized gas to atmosphere reduces the liquid pressure in the pressure vessel;

b) delivering the treating liquid to the pressure vessel in an initial step to an initial liquid pressure of 1 to 10 kg/cm$^2$, maintaining said initial liquid pressure for at least 10 minutes, and subsequently increasing said liquid pressure to a final applied liquid pressure having a value of 30 to 50 kg/cm$^2$ in a plurality of step increases of 5 to 10 kg/cm$^2$ each, followed by a holding period of at least 10 minutes following each of said step increases; and c) venting the pressurized gas in the container means to atmosphere, to thereby reduce the liquid pressure in the pressure vessel.

17. A method according to claim 16, wherein the pressurized gas in the container means is vented at a rate sufficient to reduce the liquid pressure in the pressure vessel over a period of at least 20 minutes.

* * * * *

UNITED STATES PATENT AND TRADEMARK OFFICE
CERTIFICATE OF CORRECTION

PATENT NO. : 5,686,146
DATED : November 11, 1997
INVENTOR(S) : MASATERU NOZOKI

It is certified that error appears in the above-indentified patent and that said Letters Patent is hereby corrected as shown below:

IN THE DRAWINGS:

Please replace Figure 7 with Figure 7 as attached hereto.

Signed and Sealed this

Thirty-first Day of March, 1998

*Attest:*

BRUCE LEHMAN

*Attesting Officer*    Commissioner of Patents and Trademarks